US007003400B2

(12) United States Patent  
Bryant (10) Patent No.: US 7,003,400 B2
(45) Date of Patent: Feb. 21, 2006

(54) APPARATUS AND METHOD FOR DISPLAYING SUBSURFACE ANOMALIES AND SURFACE FEATURES (75) Inventor: John Bryant, Plano, TX (US)

(73) Assignee: Bryant Consultants, Inc., Carrollton, TX (US)

( * ) Notice: Subject to any disclaimer, the term of this patent is extended or adjusted under 35 U.S.C. 154(b) by 0 days.

(21) Appl. No.: 10/691,253

(22) Filed: Oct. 22, 2003

(65) Prior Publication Data
US 2005/0090988 A1 Apr. 28, 2005

(51) Int. Cl.
G01V 9/00 (2006.01)
(52) U.S. Cl. .................... 702/5; 702/7; 702/12; 702/16
(58) Field of Classification Search .................... 702/2, 702/5, 6, 16, 12, 13; 703/1, 9, 10
See application file for complete search history.

(56) References Cited

U.S. PATENT DOCUMENTS

| 4,964,060 | A | | 10/1990 | Hartsog | |
| 5,337,149 | A | * | 8/1994 | Kozah et al. | 356/601 |
| 5,729,451 | A | * | 3/1998 | Gibbs et al. | 702/12 |
| 5,761,674 | A | | 6/1998 | Ito | |
| 5,850,206 | A | * | 12/1998 | Kashiwagi | 345/418 |
| 5,862,513 | A | * | 1/1999 | Mezzatesta et al. | 702/9 |
| 6,446,053 | B1 | | 9/2002 | Elliott | |
| 6,694,264 | B1 | * | 2/2004 | Grace | 702/16 |
| 6,801,197 | B1 | * | 10/2004 | Sanstrom | 345/419 |
| 2001/0032062 | A1 | | 10/2001 | Plaskoff | |
| 2001/0047251 | A1 | | 11/2001 | Kemp | |
| 2002/0035408 | A1 | | 3/2002 | Smith | |
| 2002/0035451 | A1 | | 3/2002 | Rothermel | |
| 2002/0050989 | A1 | * | 5/2002 | Sanstrom | 345/419 |
| 2002/0145717 | A1 | | 10/2002 | Messler | |
| 2002/0154174 | A1 | * | 10/2002 | Redlich et al. | 345/848 |
| 2003/0014212 | A1 | * | 1/2003 | Ralston et al. | 702/150 |
| 2004/0075697 | A1 | * | 4/2004 | Maudlin | 345/848 |

* cited by examiner

Primary Examiner—Donald McElheny, Jr.
(74) Attorney, Agent, or Firm—Schultz & Associates, P.C.

(57) ABSTRACT

The present invention provides a method of combining various types of data and software in order to arrive at a composite graphical representation of a construction site, including surface and subsurface features. A 2-D or 3-D graph of subsurface contoured surfaces is created. A 3-D wire-frame model of surface and subsurface features is created. Aerial photographs of the site can be incorporated and the aerial photographs contoured surfaces and wire-frame model are to produce a complete Visual Reduction Modeling Language (VRML) model of both surface and subsurface features. The VRML model allows the user to identify and visualize a relationship between sub-surface features and above ground features.

65 Claims, 7 Drawing Sheets

APPARATUS AND METHOD FOR DISPLAYING SUBSURFACE ANOMALIES AND SURFACE FEATURES

FIELD OF THE INVENTION

This invention relates to a system for assembling and displaying a 3-dimensional graphical representation of a building construction project. More particularly the invention relates to a system that combines a model of an above ground structure with a model of subsurface features to form a complete synchronized image. A display aids in visualization of the relationship between subsurface features such as water leakage, clay distribution, rocks or other subsurface features such as subsurface building and foundation elements in any combination and above ground features such as topography, fill and cut zones, and building features including slab-on-grade foundation elements and pier-and-beam foundation elements in any combination.

BACKGROUND OF THE INVENTION

In large construction projects, identification and location of subsurface anomalies are important to the success of the endeavor. Detecting subsurface anomalies currently involves analysis of geotechnical borings and monitoring of piezometers at the site. The data is used to determine the location and depth of subsurface anomalies. To obtain the data, expensive monitoring tools must be installed and often involve long term monitoring. The quantity of data produced by long term monitoring can quickly become overwhelming and threaten the success of the project. The complexity of the data can delay or prevent early recognition of anomalies which can further threaten the project.

Generally, visualization is a means for condensing and communicating vast quantities of data. Visualization provides an invaluable tool to simplify complex data and render it more useful.

Prior art visual representation of subsurface features gives some indication of site conditions. There are several prior art software programs used to visually represent subsurface anomalies. Examples are RES2DINV and RES3DINV available from Saga Geophysics located in Austin, Tex., and Environmental Visualization System (EVS) from C Tech Development Corp. located in Huntington Beach, Calif., Visual Groundwater by RockWare, Inc. located in Golden Colo., and EarthSoft's EQuIS encapsulated with AcrView GIS available from EarthSoft, Inc. located in Pensacola, Fla. Prior art systems suffer from the limitation that they do not allow for evaluation of surface and subsurface site conditions and potential anomalies in an integrated 3-D model that can be viewed from varying angles in 2-D and 3-D perspectives.

A complete evaluation of a construction site requires visualization of above ground features in conjunction with subsurface features. Currently there is not a method to combine above ground features with subsurface anomalies in order to evaluate a construction project or building site.

What is needed is a system that integrates above ground and subsurface features to visualize and identify problem areas. The system should combine a model of an above ground structure and the subsurface features below a structure to the to identify and display a relationship between features such as water leakage, clay distribution, rocks with features such as topography, fill and cut zones, and building features.

SUMMARY OF THE INVENTION

The present invention provides a method of combining various types of data and software in order to arrive at a composite graphical representation of a construction or building site and a synchronized color coded "map" of subsurface features.

The invention combines the functions of several existing software programs with a novel method of synchronization to accomplish a complete display of data from a construction or building site.

Three preferred embodiments each provide for acquiring subsurface data, enhancing the data to more easily identify voids and subsurface features such as a sand bars and other anomalies, before combining the enhanced data with a wire frame model to be displayed using the program Environmental Visualization System (EVS) commercially available from C Tech Development Corp. located in Huntington Beach, Calif.

In the first embodiment, raw resistivity data is obtained by an AGI SuperSting Administrator. The AGI SuperSting administrator is a hardware and software system to collect resistivity data and is available from Advanced Geo sciences, Inc. located in Austin, Tex. WORDPAD software, which is commercially available from Microsoft Corp., located in Redman, Wash. is used to eliminate statistical outliers and to remove text and other extraneous information from the data produced by the AGI SuperSting Administrator. RES2DINV and RES3DINV programs, which are 2-D and 3-D forward modeling programs known in the art, accept data from WORDPAD and convert it into either a 2-D or 3-D graph of contoured surfaces; RES2DINV produces a 2-D graph, RES3DINV produces a 3-D graph. SURFER available from RockWare, Inc. of Golden, Colo., is used to perform certain statistical analysis on the data to create the enhanced resistivity data which is downloaded to the EVS program.

In the second embodiment, ground penetrating radar data is obtained using a SIR-3000 ground penetrating radar system available from Geophysical Survey Systems, Inc. located in North Salem, N.H. After the ground penetrating radar data has been acquired by the SIR-3000 system, the data is downloaded to a computer where software such as Radan available from Geophysical Survey Systems, Inc. is used to enhance the data via proprietary algorithms. The enhanced data is downloaded to the EVS program.

In the third embodiment, seismic data is obtained using a SmartSeis SE underground seismic imaging system available from Geometrics, Inc. located in San Jose, Calif. After the seismic data is obtained, the data is downloaded to a computer where software such as SizeImager available from Geometrics, Inc. is used to enhance the data via proprietary algorithms. The enhanced data is downloaded to the EVS program.

After the enhanced data is downloaded to the EVS program, AUTOCAD is used to create 3-D wire-frame models of surface structures, elements of surface structures that extend below the surface, and vegetation on the site. AUTOCAD is commercially available from Autodesk, Inc. located in San Rafael, Calif. The 3-D AUTOCAD wire frame models are imported into the EVS program. The EVS program is capable of creating 3-D contour models by over-laying graphical information, such as an aerial photograph stored as a bitmap file, over the 3-D AUTOCAD wire-frame models. The EVS program is also capable of applying surfaces to the 3-D contour models resulting in an approximation of a 3-D structure.

In addition, the EVS combines the subsurface mapping data to produce a complete VRML model of both the above ground structures and the subsurface features. Because the models are produced in VRML, they can be viewed with several commercially available graphics display software packages that allow real-time rotation and translation of a composite 3-D image. The complete VRML model allows the user to identify and visualize a relationship between sub-surface features such as water leakage, clay distribution, rocks or other sub-surface features with above ground features such as topography, fill and cut zones, and building parameters.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 1:
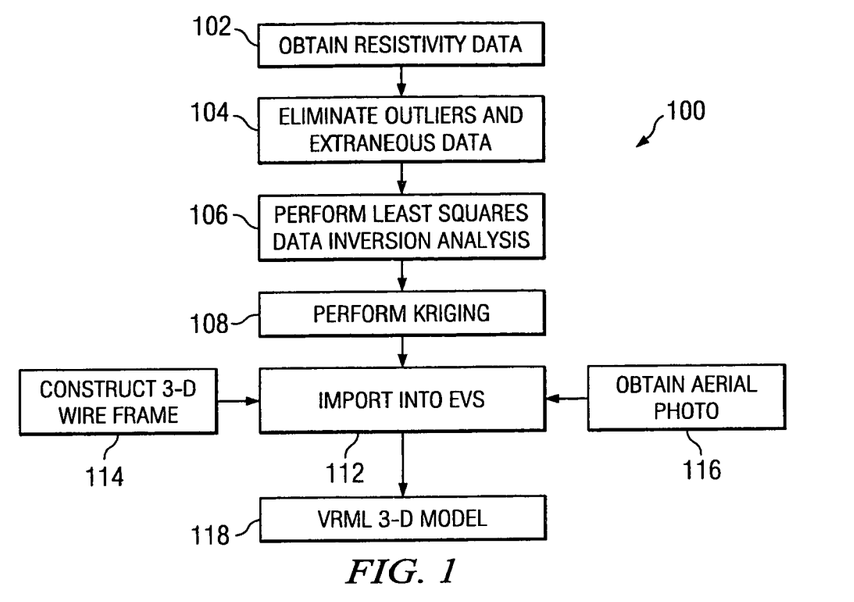
FIG. 1 is a flow chart illustrating a preferred embodiment of the invention.

FIG. 1 shows a method for combining a model of above ground structures with a model of subsurface features. Method 100 begins by obtaining subsurface mapping data that is used to detect and locate subsurface features such as water, voids, saturated clays, sandbars, rocks, structures, and the like, step 102. In the preferred embodiment, the subsurface mapping data is resistivity data resistivity data is acquired by a machine known in the industry as an AGI SuperSting. Next, a processing program such as WORDPAD is used to eliminate statistical outliers and to remove text and other extraneous information from the resistivity data required from the AGI SuperSting output, step 104. Then, two-dimensional (2-D) and three-dimensional (3-D) forward modeling programs such as RES2DINV and RES3DINV import the data from WORDPAD and perform a least squares data inversion analysis to smooth out curves created from the imported data, step 106.

The geostatistical analysis program SURFER, performs kriging and analysis on the data, step 108. Kriging is a stochastic technique similar to inverse distance weighted averaging in that uses a linear combination of weights at known points to estimate the value at grid nodes. Kriging produces an electrical resistivity model that minimizes the error of the spatial variability of the first electrical resistivity model. After the data has undergone the kriging analysis, it is exported to the program where a 2-D and 3-D model of subsurface features is generated, step 112.

Next, AUTOCAD is used to create wire-frame models of any above ground structures and vegetation, step 114. Some elements of the above ground structure may extend below the surface and the wire frame models include those elements that extend below the surface. An example of such elements are foundation elements such as slab-on-grade foundation elements and pier-and-beam foundation elements. In the preferred embodiment, an aerial photograph of the site is acquired, scanned and stored as a bitmap file, step 116. The wire frame models and aerial photograph are imported into the EVS, step 112. The EVS program overlays the aerial photograph over the 3-D wire-frame models supplied by AUTOCAD to produce 3-D contour models of the above ground structures, any elements of the structures that extend below the surface and vegetation. The EVS program applies surfaces to the 3-D contour models resulting in an approximation of 3-D structures and vegetation on the site.

The placement of the AUTOCAD wire frame model is synchronized in space with the resistivity data by spatial synchronization. The AUTOCAD wire frame model is referenced from easily definable landmarks such as the corner of a building, pad, or a U.S. Geological Benchmark. Global positioning data can be used to locate the landmarks. The coordinates for the above ground structure are defined in an x, y, z plane. The coordinates for the resistivity data are also defined in an x, y, z plane where the x, y, z coordinates are referenced from the same easily definable landmark as the AUTOCAD wire frame model. The units of measure are also synchronized at this stage. When the AUTOCAD wire frame model and the resistivity data are imported into the EVS program, each takes its coordinates from the same point and being generated in the same units of length become spatially synchronized.

EVS combines the data used to create the 2-D and 3-D model of the subsurface features and the 3-D model for the above ground structure to produce a complete Visual Reduction Modeling Language ("VRML") model of both above ground structures and the subsurface features, step 118. Because the models are produced in VRML, they can be viewed with software programs that allow real-time rotation and translation of a composite 3-D image. Examples of VRML browsers are Cosmo Player, available from Cosmo Software located in Islandia, N.Y., Cortona, available from Parallel Graphics located in Seattle, Wash., BS Contact VRML, available from Bitmanagement Software GmbH located in Berg, Germany, and OpenWorlds, available from OpenWorlds, Inc. located in Philadelphia, Pa.

The complete VRML 3-D model allows the user to identify and visualize a relationship between sub-surface features such as water leakage, clay distribution, rocks or other sub-surface features with above ground features such as topography, fill and cut zones, and building features such as walls and other structural aspects.

There are many known process for obtaining resistivity data. One process, disclosed in U.S. Pat. No. 6,295,512, herein incorporated by reference, involves a first pair of electrodes connected to a D.C. or low frequency A.C. power source. This first pair of electrodes is referred to as current electrodes. The power source impresses a current into the ground through the current electrodes. In series with the current electrodes and the power source is an ammeter. The ammeter measures the current injected into the ground by the power source. A communication means is provided to send the current measurement output of the ammeter to a processor. The processor is typically a Pentium-based personal computer connected to appropriate analog to digital converters, all well known in the art.

A second pair of electrodes, called potential electrodes, is connected in series with a volt meter between them. The volt meter measures the potential difference across the voltage electrodes created by the current impressed into the ground by the power source through the current electrodes. A communication means passes the measured potential difference data to the processor via analog to digital converters.

Figure 2A:
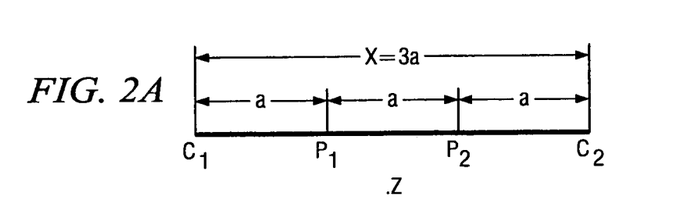
FIGS. 2a, 2b, and 2c are schematic diagrams illustrating three common electrode arrangements.
Figure 2B:
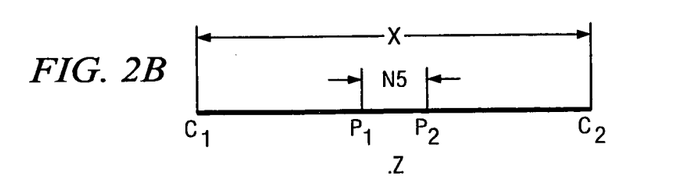
Figure 2C:
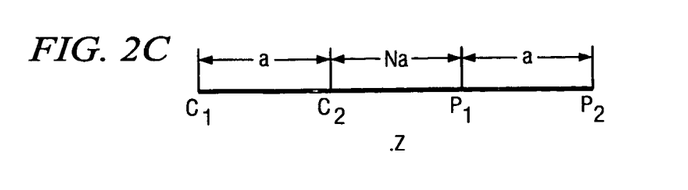

The electrodes may be arranged in any fashion. Typically, the electrodes are arranged in a straight line and are spaced in one of three patterns commonly known in the art: a Wenner arrangement, a Schlumberger arrangement, or a dipole-dipole arrangement. FIG. 2 illustrates these three spacing arrangements. In FIG. 2, "C1" and "C2" represent the current electrodes, while P1 and P2 represent the potential electrodes. "X" and "a" represent array length and electrode spacing dimensions, respectively. "Z" represents a "virtual point" in the subsurface surface that corresponds to the calculated resistivity value. The operator can calculate the depth for Z for a given measured potential difference depending on the type of spacing arrangement used and the lengths involved. The formula for calculating depth Z is commonly known. Each arrangement has advantages and disadvantages known in the art; accordingly, the arrangement used will depend on the situation in which they are applied.

When a straight-line electrode array is used, various combinations of four electrodes are used to determine the resistivity at various points in the soil beneath the straight line. Thus, the resulting resistivity map is a vertical "slice" through the soil beneath the line. Repeating the process along parallel lines allows the operator to map a three-dimensional subgrade soil volume.

Potential and current measurements from the volt meter and the ammeter are downloaded, using, for example, STINGDMP software, available from Advanced Geosciences, Inc, located in Austin, Tex. to the processor. In a preferred embodiment, the processor is a desktop or laptop personal computer with a Pentium or equivalent microprocessor. The processor calculates electrical resistivity from the measured voltage and current according to the following equation:

$$R = (V/I)K,$$

where K (an electrode geometric constant) equals the area of current flow divided by the length of the current path.

The processor also calculates, based on the known locations of the current and voltage electrodes, the virtual data point locations corresponding to the calculated resistivity values. Thus, the processor, using SWIFTCNV software from SAGA Geophysics located in Austin, Tex., or an equivalent, sorts the location and resistivity data into a number of discrete sets, each consisting of a spatial set of coordinates and a resistivity value at those coordinates.

The data is then imported into a word processing program such as Microsoft WORDPAD to be manually manipulated to eliminate statistical outliers (numerical data that is outside a predetermined range) and to remove text and other extraneous information. The predetermined range can be any range and use of such predetermined ranges is known in the art. Text and other extraneous information are typically present as the imported data generally contains far more information than is needed for the task of data visualization. Examples of information which may not be necessary are sample/measurement date, quality assurance information, and name(s) of companies or individuals related to the project. WORDPAD, allows a user to manually, or a program to automatically, examine for and remove any extraneous information and outliers. WORDPAD also arranges the data into a proper format for a least squares data inversion analysis.

Figure 3:
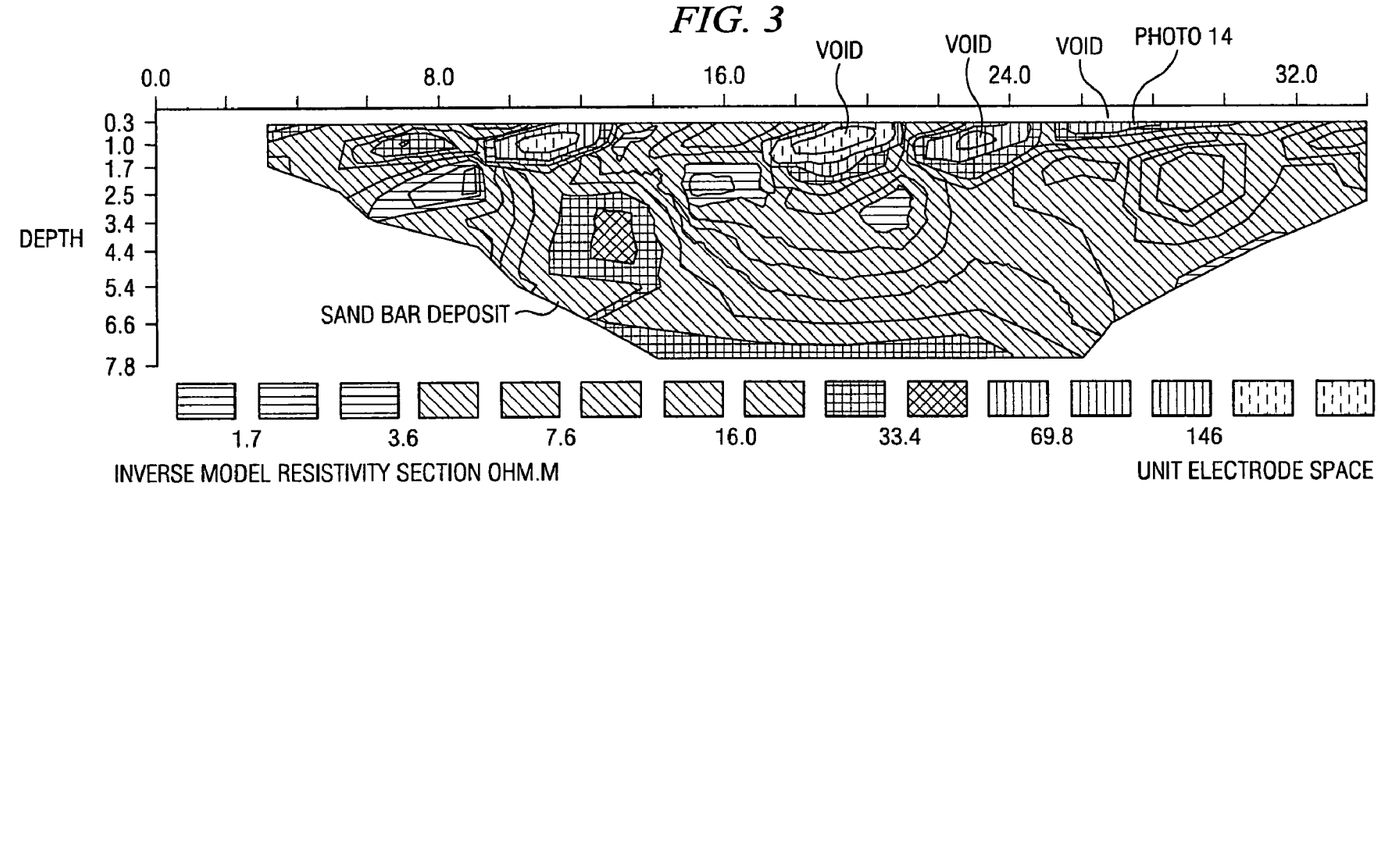
FIG. 3 is an example of a resistivity model.

Software such as RES2DINV and RES3DINV may is used to perform the least squares data inversion and create a 2-D or 3-D first electrical resistivity model. The 2-D or 3-D first electrical resistivity model minimizes the error of the field data. FIG. 3 is an example of a 2-D first electrical resistivity model of the least squares data inversion analysis. FIG. 3 shows ill-defined voids and subsurface features such as a sandbar.

The next step is to perform a spatial data analysis using geostatistical methods, such as kriging. Kriging uses a variogram (also known as semivariogram) which is a representation of the spatial and data differences between some or all possible "pairs" of points in the measured data set. The variogram uses weighting factors that will be applied to the measured data set for an interpolation of points so as to minimize the error of the spatial variability. Unlike other estimation procedures, kriging provides a measure of the error and associated confidence in the estimates. Cokriging is similar to kriging except it uses two correlated measured values to compensate for missing values by utilizing secondary variable data known in the art as co-variate data. Cokriging is most effective when covariates are highly correlated. Both kriging and cokriging can be used in the present invention.

Figure 4:
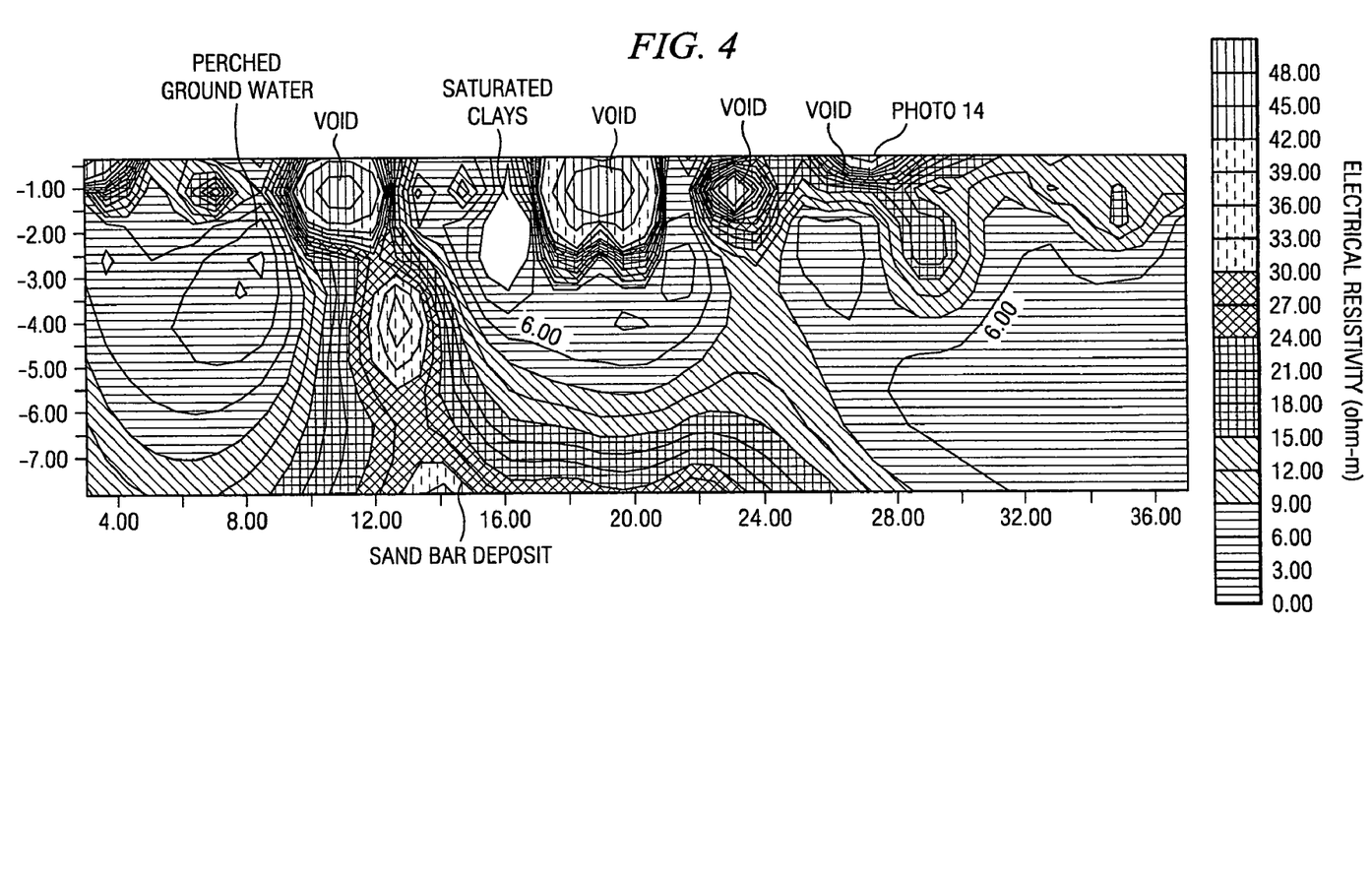
FIG. 4 is an example of a resistivity model.

Kriging produces a second electrical resistivity model that minimizes the error of the spatial variability of the first electrical resistivity model. While in the preferred embodiment the software program SURFER is used to perform kriging, any geostatistical analysis program capable of performing kriging may be used. Again, the output is typically a 2-D or 3-D graphical representation of location and resistivity. FIG. 4 is an example of a 2-D color graphical output of the kriging analysis. FIG. 4 shows voids, saturated soil, ground water and sandbar deposits.

The subsurface data used to produce the 2-D or 3-D graphical representation of location and resistivity of soil anomalies is stored as an ASCII or text file. Spreadsheets and databases can readily import and export ASCII files and they can be stored and edited with programs such as NOTEPAD or EXCEL commercially available from Microsoft Corp. The data may be edited to eliminate extraneous data or to add data such as identifying data. Examples of identifying data included sample location, the date of the analysis, or the company or person who obtained the subsurface data. The 2-D or 3-D subsurface data used to create a graphical representation of location and resistivity of soil anomalies is exported to the EVS.

The EVS uses the imported 2-D and 3-D subsurface data to create a VRML model and provides a fill spectrum of 2-D and 3-D gridding options, including: rectilinear grids with uniform spacing in x, y, & z directions; rectilinear grids with uniform spacing in x & y directions with z spacing determined by geologic layers; finite difference type grids with variable spacing in x & y directions and z spacing determined by geologic layers; convex hull bounded gridding with z spacing determined by geologic layers; and adaptive gridding which automatically refines gridding in the cell(s) surrounding measured samples to ensure that the interpolated results and isosurfaces accurately honor measured sample data.

The EVS also provides a library of data filtering and subsetting modules. The options include filtering the data based on isovolumes or isosurfaces of the data range, performing mathematical manipulation of multiple data fields, and slicing, cutting, and presenting isolines on all or subsetted regions of the data.

The EVS extracts isovolumes and isosurfaces from the kriged data and provides the ability to include any number of arbitrarily placed and oriented slice and cutting planes within the 3-D kriged data domain. The planes are positioned by controlling rotations about three axes and the position or distance of the plane from a domain centroid.

The EVS's three dimensional viewer allows real time rotations and manipulations on the image displayed to the viewer. The EVS provides complete interactive control over viewing perspective, azimuth, elevation, scale and background color. Numerous other viewing parameters can also be controlled such as object rendering method, shading, outlining, object transparency, lighting such as number, color and type of lights, and background color. The isosurface level is user controllable, can be animated, and plots can be labeled within the EVS.

In the preferred embodiment, the EVS creates a VRML output file. VRML is a network transparent protocol for communicating 3-D graphics over the Internet. A basic hypertext markup language ("HTML") web browser can process VRML files with a special purpose 3-D viewer called a VRML browser. The VRML browser may be supplied with the HTML browser or downloaded separately. Examples of VRML browsers are Cosmo Player, available from Cosmo Software located in Islandia, N.Y., Cortona, available from Parallel Graphics located in Seattle, Wash., BS Contact VRML, available from Bitmanagement Software GmbH located in Berg, Germany, and OpenWorlds, available from OpenWorlds, Inc. located in Philadelphia, Pa.

Also, because the EVS runs under most versions of Microsoft Windows operating systems, there are numerous options for printing output. The EVS can render a scene to a user defined resolution. The scene may be "captured" to the clipboard and pasted into another application or printed directly from the program at a user specified resolution. The EVS also includes an Output_Images module which will create Windows Bitmap (.bmp) files, compressed or uncompressed targa files, or a color postscript file suitable for direct output to a postscript printer. All bitmap images can be imported into other applications such as CorelDraw, or Adobe Illustrator to add additional annotation and to print. Specific views of site anomalies and views of the actual site can be captured. In addition to printing, EVS can create animation sequences. These animations can be produced as Windows Audio-Visual Interleaved (.avi) Data files or, with special hardware, written directly to National Television System Committee ("NTSC") video formats such as VHS.

Figure 5:
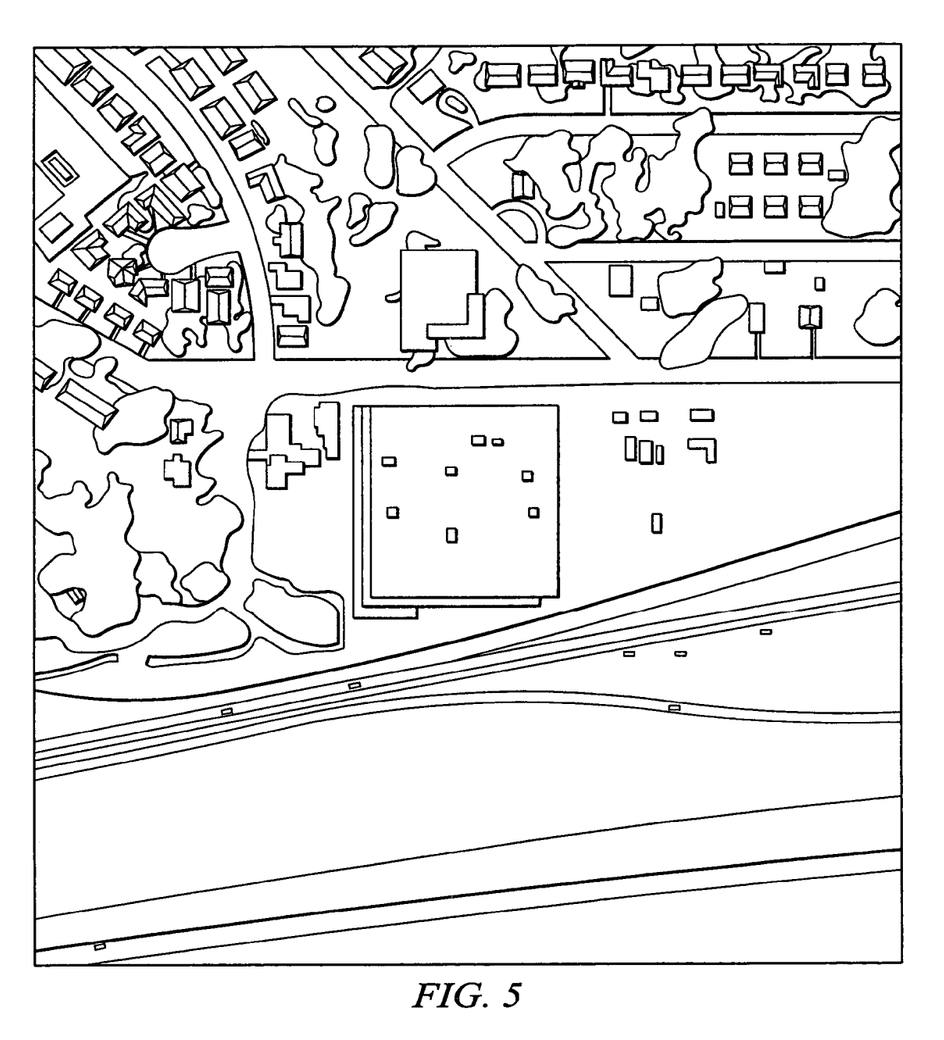
FIG. 5 is a drawing representing textures found in an aerial photograph of a site.
Figure 6:
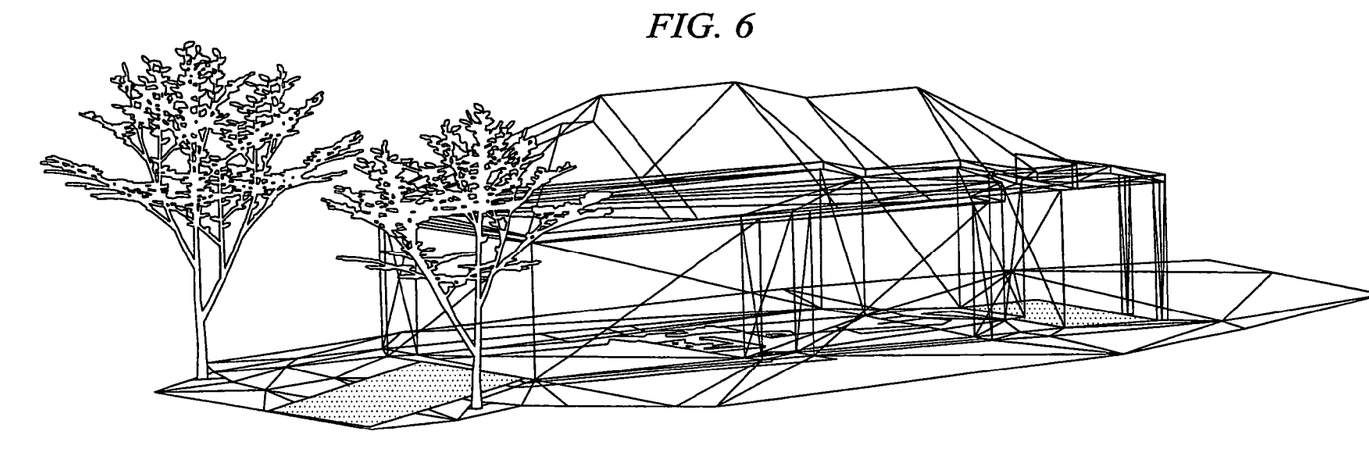
FIG. 6 is a 3-D wire frame model of a structure and surrounding vegetation.

In addition to producing a 2-D or 3-D graphical representation of the location and resistivity of soil anomalies, the EVS also overlays graphical information such as an aerial photograph of the site, FIG. 5, stored as a Bitmap file over a 3-D wire-frame model such as that supplied by AUTOCAD, FIG. 6. The Bitmap file can also include various graphical "textures" designed to represent objects and surfaces generated by AUTOCAD or other graphical programs. The AUTOCAD 3-D wire-frame model of the site is created from pictures of a structure, building plans, or other similar means used to construct 3-D wire frame models of structures. Construction site plans, pictures or other similar means are used to complete the wire frame 3-D model of the above ground structures, elements of the above ground structures that extend below the ground, and surrounding vegetation and create a wire frame 3-D approximation of the site.

Figure 7:
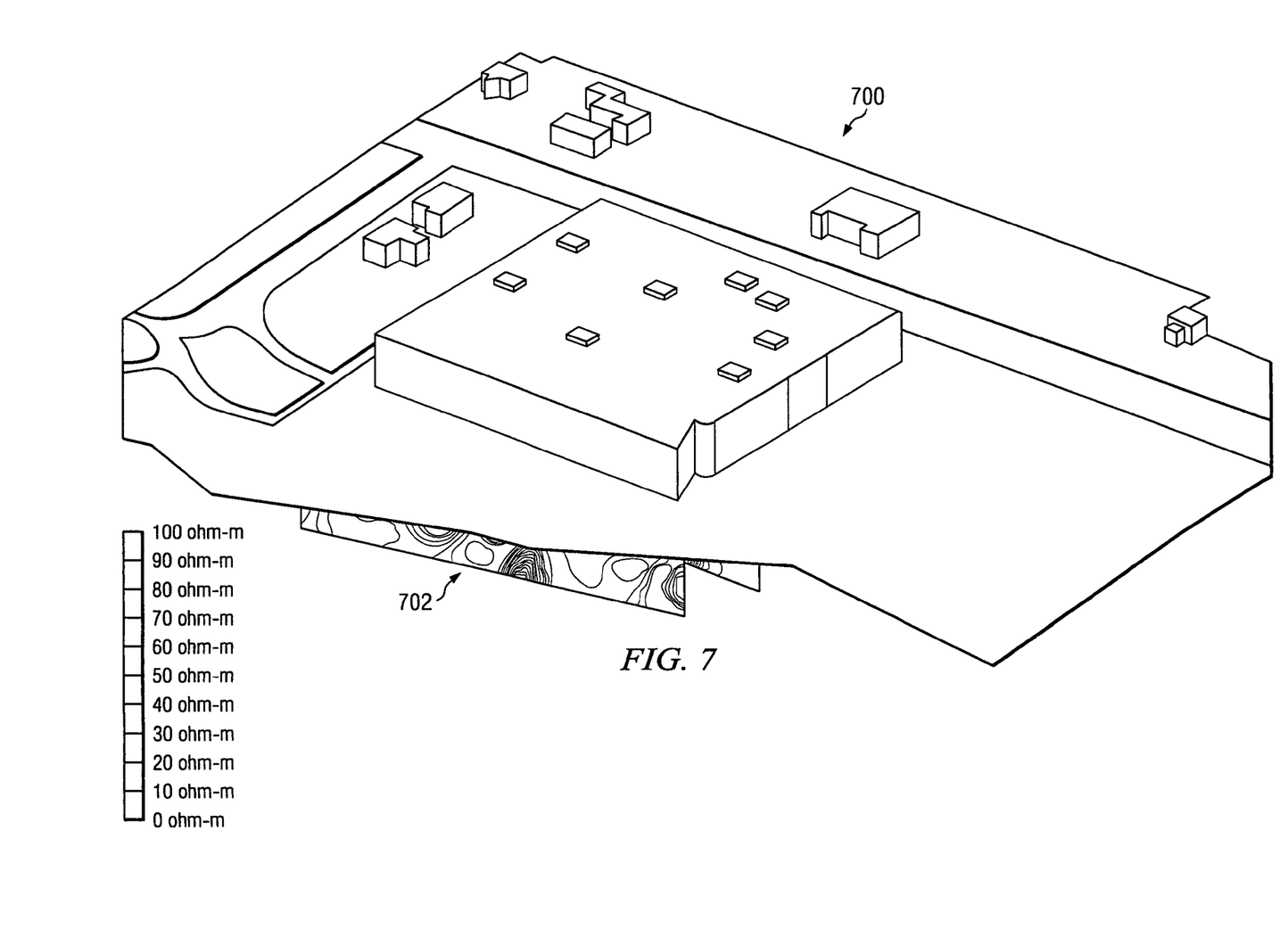
FIG. 7 is a VRML 3-D model of a structure and surrounding vegetation and a 2-D model of subsurface features.
Figure 8:
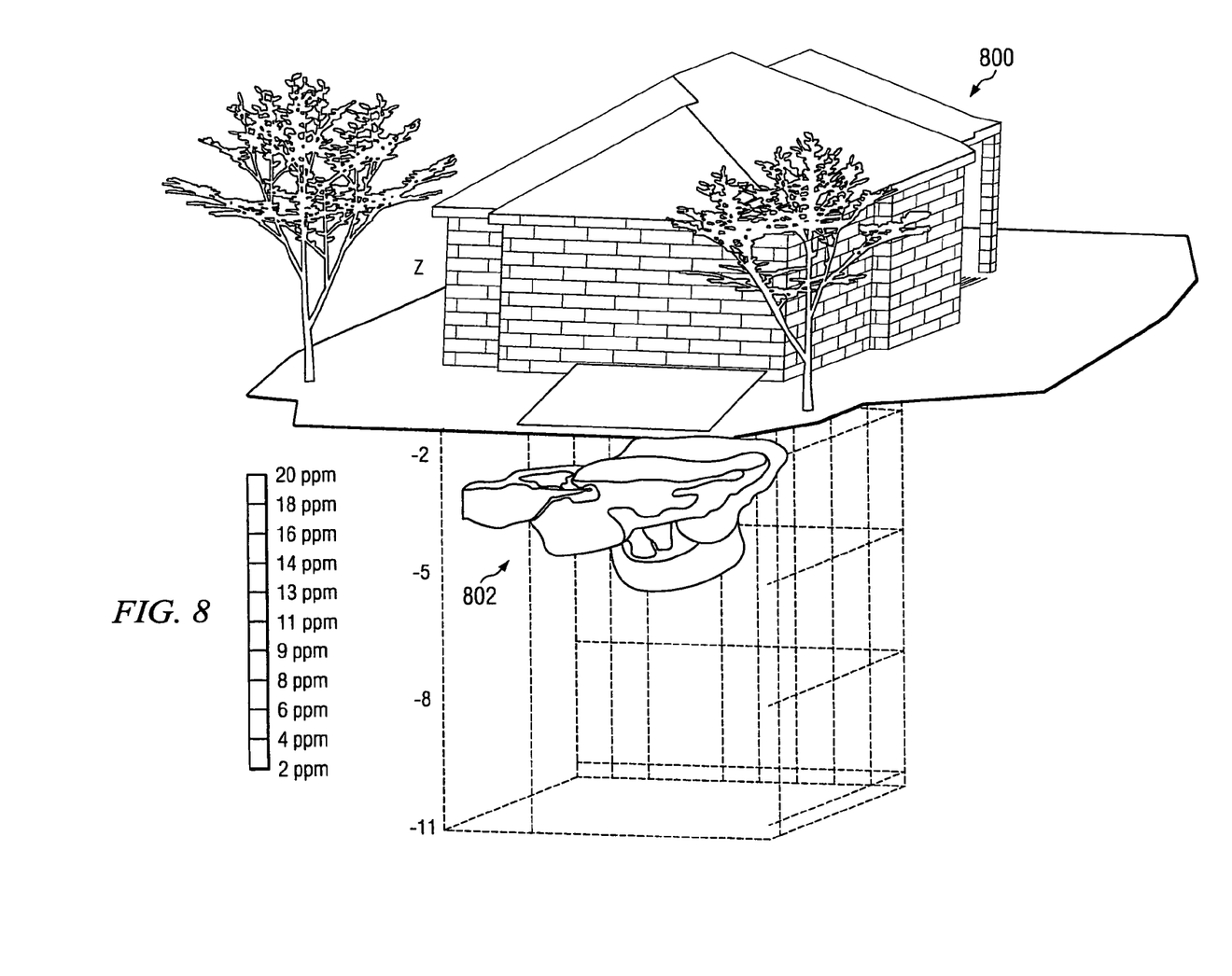
FIG. 8 is a VRML 3-D model of a structure and surrounding vegetation and a 3-D model of subsurface features.

The wire-frame model is submitted directly to the EVS along with the corresponding aerial photographs. The EVS software applies the coloration of the aerial photograph to the 3-D AUTOCAD model to arrive at a VRML 3-D model 700, FIG. 7 and 800, FIG. 8 for the above ground structures, elements of the above ground structures that extend below the ground and surrounding area. The EVS uses the imported 2-D and 3-D subsurface data to create a VRML model for the subsurface features. FIG. 7 shows a VRML model with subsurface features in 2-D 702. FIG. 8 shows a VRML model with the subsurface features in 3-D 802. Each model has advantages and disadvantages known in the art and those skilled in the art will know which model to use depending on the situation in which they are applied. The VRML 3-D model for the above ground structure is combined with the VRML 2-D or 3-D model for the subsurface features to create a VRML model of both the above ground structure and subsurface features.

Once combined, the VRML model forms a complete image which allows the user to identify and visualize a relationship between sub-surface features such as water leakage, clay distribution, rocks or other sub-surface features with above ground features such as topography, fill and cut zones, and building parameters. For example, a homogeneous subgrade soil volume will have a relatively uniform resistivity profile. However, certain anomalies such as voids, vegetation, or fluids will cause an increase or decrease in resistivity. For example, a void may appear as an area of particularly high electrical resistivity. On the other hand, a water main leak resulting in wet soil subjacent to the water main piping may appear as an area with a particularly low resistivity compared with the remainder of the soil volume. By analyzing the VRML model the user can detect and locate resistivity spikes or depressions and correlate these discontinuities with certain soil anomalies. For example, in FIG. 4 high resistivity areas might be marked in red; low resistivity areas might be marked in various shades of blue, indicating possible voids or wet soil, respectively. The VRML model also allows the user to plan proper locations for proposed new building sites. Also, using the VRML model, users can analyze problems related to an existing structure such as leakage or soil shifting.

While the invention has been described with respect to resistivity data, other subsurface mapping data may be used, such as ground penetrating radar data or seismic data. Ground penetrating radar data is acquired via a SIR-3000 ground penetrating radar system available from Geophysical Survey Systems, Inc. located in North Salem, N.H. After the subsurface mapping data has been acquired by the SIR-3000 system, the data is downloaded to a computer where software such as Radan available from Geophysical Survey Systems, Inc. is used to enhance the data via proprietary algorithms. Examples of enhancing the data include applying user specific gains, setting the data to time zero, and specifying the dielectric permeability of the survey area. Such enhancements make it easier to define voids and subsurface features such as a sand bar. No statistical number crunching is performed upon the data, i.e. statistical outliers are not removed and a least squares inversion analysis is not performed. Once the data is enhanced, it is downloaded into the EVS program and the data is combined with a wire frame 3-D approximation of the site and aerial photograph as explained above.

Seismic data is acquired using a SmartSeis SE underground seismic imaging system available from Geometrics, Inc. located in San Jose, Calif. After the seismic data is acquired, the data is downloaded to a computer where software such as SizeImager available from Geometrics, Inc. is used to enhance the data via proprietary algorithms. Examples of enhancing the data include applying user specific gains, setting the data to time zero, and specifying the dielectric permeability of the survey area. Such enhancements make it easier to define voids and subsurface features such as a sand bar. The enhanced data is then downloaded directly into the EVS program and the data is combined with a wire frame 3-D approximation of the site and aerial photograph as explained above.

Although the invention has been described with reference to one or more preferred embodiments, this description is not to be construed in a limiting sense. There may be modification of the disclosed embodiments, as well as alternative embodiments of this invention, which will be apparent to persons of ordinary skill in the art, and the invention shall be viewed as limited only by reference to the following claims.

The invention claimed is:

1. A method of combining data to arrive at a composite graphical representation of a construction site comprising, the steps of:
providing subsurface mapping data;
creating a subsurface model of subsurface features from the subsurface mapping data;
creating a wire frame model of an above surface feature;
overlaying the wire frame model with a pictorial representation of the above surface feature; and
combining the wire frame model with the subsurface model to produce the composite graphical representation.

2. The method of claim 1 wherein the subsurface mapping data is resistivity data.

3. The method of claim 2 wherein the resistivity data is taken from an AGI SuperSting program.

4. The method of claim 2 further comprising the step of removing a statistical outlier from the resistivity data.

5. The method of claim 4 wherein a word processing program is used to remove the outlier.

6. The method of claim 5 wherein the word processing program is WORDPAD.

7. The method of claim 2 further comprising the step of performing a least squares data inversion analysis on the resistivity data.

8. The method of claim 7 wherein the least squares data inversion analysis is preformed by a RES3DINV program.

9. The method of claim 7 wherein the least squares data inversion analysis is performed by a RES2DINV program.

10. The method of claim 2 further comprising the step of performing a kriging analysis on the resistivity data.

11. The method of claim 10 wherein the analysis is preformed by SURFER software.

12. The method of claim 2 further comprising the step of performing a cokriging analysis on the resistivity data.

13. The method of claim 1 wherein the subsurface mapping data is ground penetrating radar data.

14. The method of claim 13 wherein the ground penetrating radar data is acquired through a SIR-3000 ground penetrating radar system.

15. The method of claim 13 wherein the data is enhanced.

16. The method of claim 15 wherein the program Radan is used to enhance the data.

17. The method of claim 1 wherein the subsurface mapping data is seismic data.

18. The method of claim 17 wherein the seismic data is acquired from a SmartSeis seismic imaging system.

19. The method of claim 17 wherein the data is enhanced.

20. The method of claim 19 wherein the program Sizelmager is used to enhance the data.

21. The method of claim 1 wherein the wire frame model is created using AUTOCAD software.

22. The method of claim 1 wherein the wire frame model includes a model of vegetation.

23. The method of claim 1 wherein the wire frame model includes a model of a building.

24. The method of claim 1 wherein the pictorial representation is an aerial photograph.

25. The method of claim 24 wherein the aerial photograph is imported into EVS software.

26. The method of claim 1 wherein the subsurface model comprises at least one 2-dimensional graph.

27. The method of claim 1 wherein the subsurface model comprises at least one 3-dimensional graph.

28. The method of claim 1 wherein the composite graphical representation is produced in Visual Reduction Modeling Language.

29. The method of claim 28 wherein the graphical representation is viewed as a web page.

30. The method of claim 1 comprising the further step of displaying the composite graphical representation.

31. The method of claim 1 wherein the composite graphical representation can be rotated.

32. The method of claim 1 wherein the pictorial representation is a representation of texture.

33. The method of claim 1 including the additional step of viewing a 2-dimensional slice of the composite graphical representation.

34. The method of claim 1 wherein the graphical representation is used in a AVI file.

35. The method of claim 1 wherein the wire frame model includes below sufface ground structures.

36. A 3-dimensional model of a construction site comprising:
a graphical model of subsurface mapping data;
a spatial model of an above ground object; and
a 2-dimensional image of the above ground object superimposed on the spatial model and spatially synchronized with the graphical model of resistivity data.

37. The 3-dimensional model of claim 36 wherein the graphical model is prepared using kriging.

38. The 3-dimensional model of claim 36 wherein the spatial model is prepared using AUTOCAD.

39. The 3-dimensional model of claim 36 wherein the 3-dimensional model is rendered in Visual Reduction Modeling Language.

40. The 3-dimensional model of claim 36 wherein the subsurface mapping data is resistivity data.

41. The 3-dimensional model of claim 40 wherein the resistivity data includes data related to moisture content.

42. The 3-dimensional model of claim 40 wherein the resistivity data includes data related to a void.

43. The 3-dimenstional model of claim 40 wherein the resistivity data includes data related to a subsurface anomaly.

44. The 3-dimenstional model of claim 40 wherein the resistivity data is derived through use of the equation:

$$R=(V/I)K;$$

where K is an electrode geometric constant;
R is resistance;
V is voltage; and
I is current.

45. The 3-dimensional model of claim 36 wherein the subsurface mapping data is ground penetrating radar data.

46. The 3-dimensional model of claim 36 wherein the subsurface mapping data is seismic data.

47. A method of creating a graphical model comprising the steps of:
testing to determine subsurface mapping data;
enhancing the data;
constructing a wire frame model of an above ground structure;
providing a pictorial representation of a plan view of the above ground structure;
combining the pictorial representation with the wire frame model;
aligning the subsurface mapping data with the combined pictorial representation and wire frame model; and
merging the subsurface mapping data with the combined pictorial representation and wire frame model.

48. The method of claim 47 wherein the subsurface mapping data is resistivity data.

49. The method of claim 48 wherein the data is enhanced by performing a least squares data inversion analysis on the subsurface mapping data.

50. The method of claim 48 wherein the data is enhanced by performing a kriging analysis on the subsurface mapping data.

51. The method of claim 47 wherein the step of testing includes choosing a placement for electrodes.

52. The method of claim 51 wherein the placement is the Wenner arrangement.

53. The method of claim 51 wherein the placement is the Schiumberger arrangement.

54. The method of claim 51 wherein the placement is the dipole dipole arrangement.

55. The method of claim 47 wherein the step of combining is carried out with AUTOCAD software.

56. The method of claim 47 wherein the step of merging is carried out with EVS software.

57. The method of claim 47 wherein the step of merging results in a VRML file.

58. The method of claim 47 further comprising the step of visually displaying the merged subsurface mapping data, combined pictorial representation and wire frame model.

59. The method of claim 58 wherein the pictorial representation can be rotated.

60. The method of claim 47 wherein the step of merging results in an HTML file.

61. The method of claim 47 wherein the subsurface mapping data is ground penetrating radar data.

62. The method of claim 61 wherein the program Radan is used to enhance the data.

63. The method of claim 47 wherein the subsurface mapping data is seismic data.

64. The method of claim 63 wherein the program Sizelmager is used to enhance the data.

65. The method of claim 48 wherein the wire frame model includes below ground structures.

\* \* \* \* \*